J. H. VENNERS.
STEERING MECHANISM FOR MOTOR VEHICLES.
APPLICATION FILED AUG. 23, 1911.
1,049,421.
Patented Jan. 7, 1913.
2 SHEETS—SHEET 1.
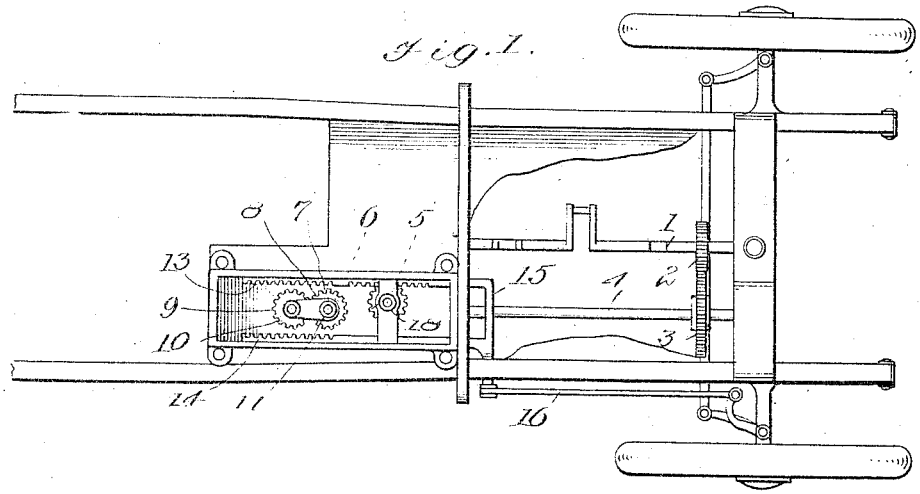
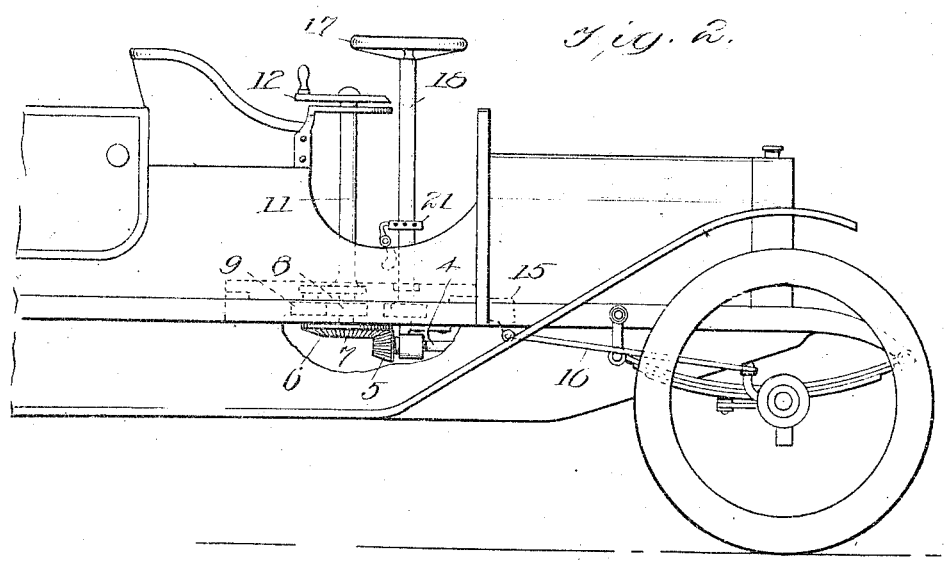
Witnesses
H. Barry
V. B. Hillyard
Inventor
James H. Venners
By Victor J. Evans
Attorney J. H. VENNERS.
STEERING MECHANISM FOR MOTOR VEHICLES.
APPLICATION FILED AUG. 23, 1911.
1,049,421.
Patented Jan. 7, 1913.
2 SHEETS—SHEET 2.
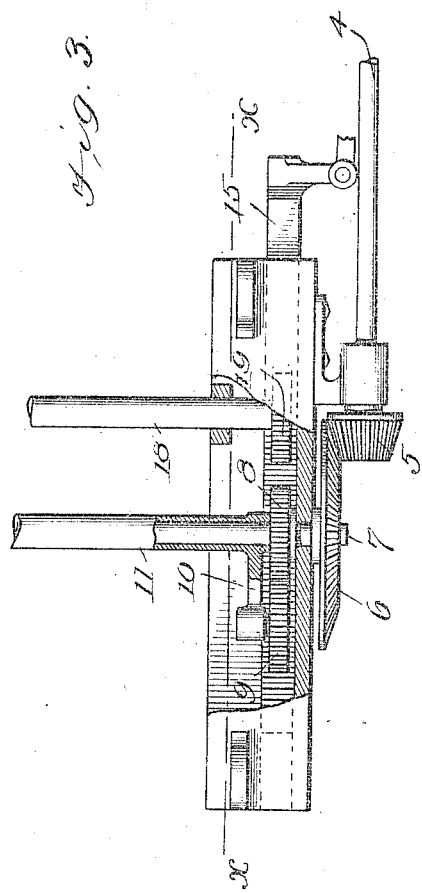
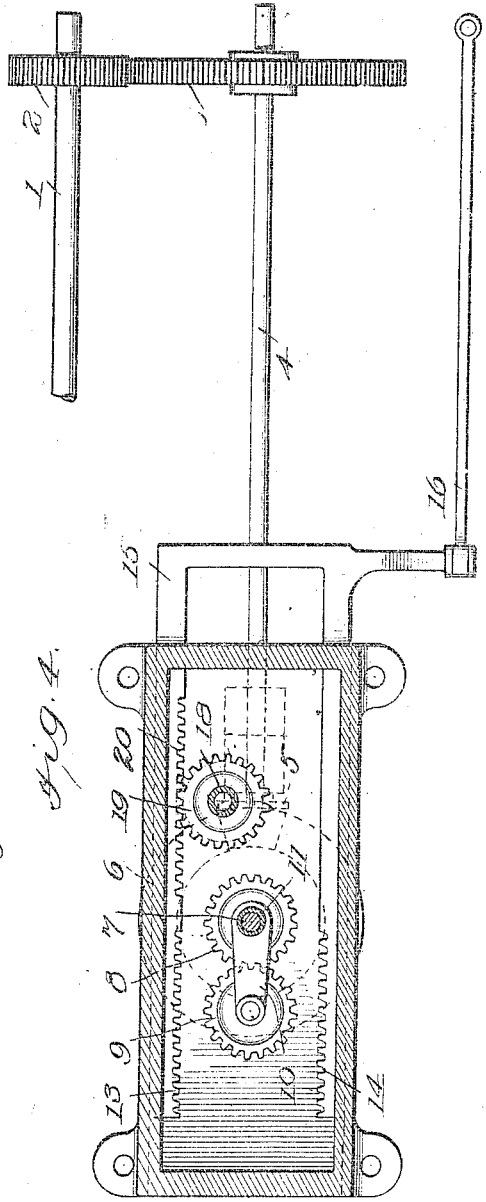
Witnesses
H. C. Barry
U. B. Hillyard.
Inventor
James H. Venners
By Victor J. Evans
Attorney

UNITED STATES PATENT OFFICE.

JAMES H. VENNERS, OF BROOKLYN, NEW YORK, ASSIGNOR OF ONE-FOURTH TO WILLIAM L. MILLSPAUGH, ONE-FOURTH TO WALTER W. COURT, AND ONE-FOURTH TO FREDERIC VENNERS COURT, ALL OF BROOKLYN, NEW YORK.

STEERING MECHANISM FOR MOTOR-VEHICLES.

1,049,421.  Specification of Letters Patent. Patented Jan. 7, 1913.

Application filed August 23, 1911. Serial No. 645,565.

*To all whom it may concern:*

Be it known that I, JAMES H. VENNERS, a citizen of the United States, residing at Brooklyn, in the county of Kings and State of New York, have invented new and useful Improvements in Steering Mechanism for Motor-Vehicles, of which the following is a specification.

The present invention relates to motor power vehicles of the general class having a hand steering wheel connected to any type of mechanism to perform the movement required to steer the vehicle by hand power.

The object of the invention is to attach to a vehicle an interchangeable mechanism having means for steering the vehicle either by hand power or motor power with the same appliance; also to provide means whereby the change from hand to motor power may be effected instantly without requiring the operator to leave his seat.

It is well known that hand power steering is not only laborious but requires constant control of the hand wheel, which if left free from the hand of the operator, especially when the vehicle is traveling at a high rate of speed, the front wheels frequently change position, thereby resulting in an accident before the operator can readjust the steering wheels to safety.

In the present invention means are provided to avoid the objections noted, since the invention provides means for changing the position of the steering wheels from the greatest radius in perfect time with the speed of the vehicle, so that when traveling at a low speed the steering mechanism will be correspondingly slow and if running at a high speed the steering movement will be performed in perfect harmony with the speed of the vehicle, thereby reducing the liability to accident to the smallest amount possible, since the imperfect action of steering by hand power depending upon the judgment of the operator as to relative speed of the vehicle is wholly overcome.

The invention further contemplates means for locking the steering post in the located position so that both hands of the operator may be left free, the locking mechanism securing the steering mechanism in the adjusted position whether moved by hand or by power derived from the motor or engine.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a plan view of part of an automobile provided with steering mechanism embodying the invention. Fig. 2 is a side view. Fig. 3 is a detail view, showing more clearly the parts associated with the steering mechanism. Fig. 4 is a horizontal section on the line $x$—$x$ of Fig. 3.

Corresponding and like parts are referred to in the following description, and indicated in all the views of the drawings, by the same reference characters.

The shaft of the motor or engine employed for driving the vehicle is indicated at 1 and is provided with a pinion 2, which is in mesh with a gear wheel 3 fastened to a shaft 4, which transmits motion from the motor shaft to the gearing for operating the steering mechanism. A bevel pinion 5, secured to the shaft 4, is in mesh with a bevel gear wheel 6, which is secured to a shaft 7 having a vertical arrangement. A gear wheel 8 secured to the shaft 7 is in mesh with a gear wheel 9 mounted upon an arm 10, which is attached to the lower end of a hollow shaft 11 mounted upon the shaft 7. A hand lever 12 is secured to the upper end of the shaft 11 and provides convenient means for turning said shaft either to the right or to the left to throw the gear wheel 9 into meshing engagement with cog teeth 13 or 14 of a frame 15, which latter is connected by means of a rod or bar 16 to a convenient part of the steering mechanism, such as the arm of a steering knuckle or the rod connecting the arms of the steering knuckles of a motor driven vehicle. It is to be understood that any well known means may be employed to hold the lever 12 in a given position with the gear wheel 9 neutral. When the motor is in operation the shaft 4 is continuously driven in the same direction and imparts a rotary movement to the shaft 7 and to the gear wheels 8 and 9. Upon turning the shaft 11 either to the right or to the left the gear wheel 9 is thrown into engagement with one or the other sets of cog teeth 13 or 14, thereby moving the frame 15 either forwardly or rearwardly to cause the vehicle to turn either to the right or to the left. When the shaft 11 is turned to throw the gear wheel 9 into a neutral position, that is out of mesh with both sets of cog teeth 13 and 14, the steering mechanism may be locked in the adjusted position or may be moved by hand in the usual manner by means of the accustomed hand wheel 17 which is secured to the upper end of the steering post 18, which in the present instance is arranged vertically. A gear wheel 19 secured to the steering post 18 meshes with cog teeth 20 provided upon the frame 15, whereby the latter may be moved by hand when the steering mechanism is manually operated. A locking mechanism 21 is provided for securing the steering post 18 in the located position and this locking mechanism may consist of a lever and a toothed bar, thereby admitting of securing the steering post when turned to any required angular position.

When the vehicle is to be steered by hand the shaft 11 is turned to throw the gear wheel 9 out of mesh with the cog teeth 13 and 14 when manipulation of the hand wheel 17 results in moving the frame 15 and the steering wheels in the usual manner. Should it be required to operate the steering mechanism by means of the motor the shaft 11 is turned in the proper direction to bring the gear wheel 9 into engagement with either set of cog teeth 13 or 14, when the frame 15 will be moved in the required direction. It is observed that the frame 15 when moved by power derived from the motor is governed by the speed of the vehicle, with the result that the steering mechanism is moved in harmony with the speed at which the vehicle is driven, thereby moving the steering wheels slowly or quickly according to whether the machine is driven at a low speed or at a high speed. When the steering mechanism is adjusted its position may be fixed by the locking mechanism 21, thereby leaving the hands of the driver or operator of the vehicle free.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. In steering mechanism for mechanically propelled vehicles, the combination of a frame provided with two sets of cog teeth and adapted to be connected with the steering mechanism, a gear wheel, connecting means between said gear wheel and the motor employed for driving the vehicle, a second gear wheel in mesh with the first mentioned gear wheel and deriving power therefrom, and means for throwing the said second gear wheel into mesh with either one of the sets of cog teeth.

2. In steering mechanism for mechanically propelled vehicles, the combination of a frame provided with two sets of cog teeth and having connection with the steering mechanism, a gear wheel, connecting means between said gear wheel and the motor for driving the vehicle, a shaft having an arm, a second gear wheel mounted upon said arm and in mesh with the first mentioned gear wheel and deriving power therefrom, and means for turning the shaft and arm to throw the second gear wheel into engagement with either the of the sets of cog teeth.

3. In steering mechanism for mechanically propelled vehicles, the combination of a frame provided with two sets of cog teeth, a steering post adapted to be operated by hand, a gear wheel connected with the steering post and in mesh with one set of cog teeth of said frame to admit of steering the vehicle by hand, a second gear wheel, connecting means between the second gear wheel and motor of the vehicle, a third gear wheel in mesh with said second gear wheel, and means for moving the third gear wheel to throw it into engagement with either one of the two sets of cog teeth, whereby the vehicle may be steered by power derived from the motor.

4. In steering mechanism for mechanically propelled vehicles, the combination of a frame provided with two sets of cog teeth, a steering post adapted to be operated by hand, a gear wheel connected with the steering post and in mesh with one set of cog teeth of said frame to admit of steering the vehicle by hand, a second gear wheel, connecting means between the second gear wheel and motor of the vehicle, a third gear wheel in mesh with said second gear wheel, means for moving the third gear wheel to throw it into engagement with either one of the two sets of cog teeth, whereby the vehicle may be steered by power derived from the motor, and a lock mechanism for securing the steering mechanism in the adjusted position, thereby leaving both hands of the driver free.

In testimony whereof I affix my signature in presence of two witnesses.

JAMES H. VENNERS.

Witnesses:
WALTER W. COURT,
G. M. KASEMAN.